United States Patent Office.

WILLIAM S. FICKETT, OF ROCHESTER, NEW YORK, ASSIGNOR OF THREE-FIFTHS TO WARREN R. CLARK AND HENRY C. DANIELS, BOTH OF SAME PLACE.

PRESERVATIVE COMPOUND.

SPECIFICATION forming part of Letters Patent No. 285,350, dated September 18, 1883.

Application filed July 21, 1883. (Specimens.)

*To all whom it may concern:*

Be it known that I, WILLIAM S. FICKETT, a citizen of the United States, residing at Rochester, in the county of Monroe and State of New York, have invented certain new and useful Improvements in Preservative Compounds; and I do hereby declare the following to be a full, clear, and exact description of the invention, such as will enable others skilled in the art to which it appertains to make and use the same.

My invention consists in a new mode of producing a new preservative compound from boracic acid and glycerine, as hereinafter described. Heretofore by one method such a compound has been produced from these ingredients by heating glycerine to near its boiling-point and adding boracic acid until it ceases to be dissolved, and maintaining that mixture to a temperature of 200° centigrade as long as water is given off, the proportions, by weight, being about ninety-two parts of glycerine to sixty-two parts of boracic acid. By this and other similar methods now practiced, by which glycerine is used as a solvent of boracic acid, these ingredients are subjected to so high a degree of heat that they undergo an interchange and disintegration of their component parts. Water is formed and steam is given off, and a large loss (about thirty-three per cent.) of weight of materials is the result, and a compound is thus produced composed of certain proportions of the residuum of these ingredients, and having certain peculiar characteristics.

Now, my process consists in taking equal quantities of glycerine and crystallized boracic acid, placing the same in a closed or sealed vessel, and then applying heat at or about 300° Fahrenheit for or about two hours, which causes the boracic acid to dissolve and blend with the glycerine. On cooling it forms, without loss of weight, into an opalescent semi-solid, freely soluble in cold water, entirely devoid of bitter or metallic taste, and communicating no objectionable taste to butter or like delicate foods. When thus produced it is an unfailing preventive of fermentation and decay in animal or vegetable matter or fluid compounds. By my process it will be seen no such proportions of the ingredients employed in the former-mentioned processes are necessary, no loss of material is sustained, and no reheating is required to prepare it for use. By my process, also, the article is necessarily given the above-mentioned peculiar characteristics, which distinguish it from other similar compounds in the market.

Having thus described my invention, what I claim, and desire to secure by Letters Patent, is—

1. The process of preparing a preservative compound composed of glycerine and boracic acid by subjecting them to pressure under heat, substantially as described.

2. The preservative compound herein described, consisting of equal proportions of boracic acid and glycerine, and having the characteristics set forth.

In testimony whereof I affix my signature in presence of two witnesses.

WILLIAM S. FICKETT.

Witnesses:
 WARREN R. CLARK,
 HENRY C. DANIELS.